Patented Feb. 19, 1924.

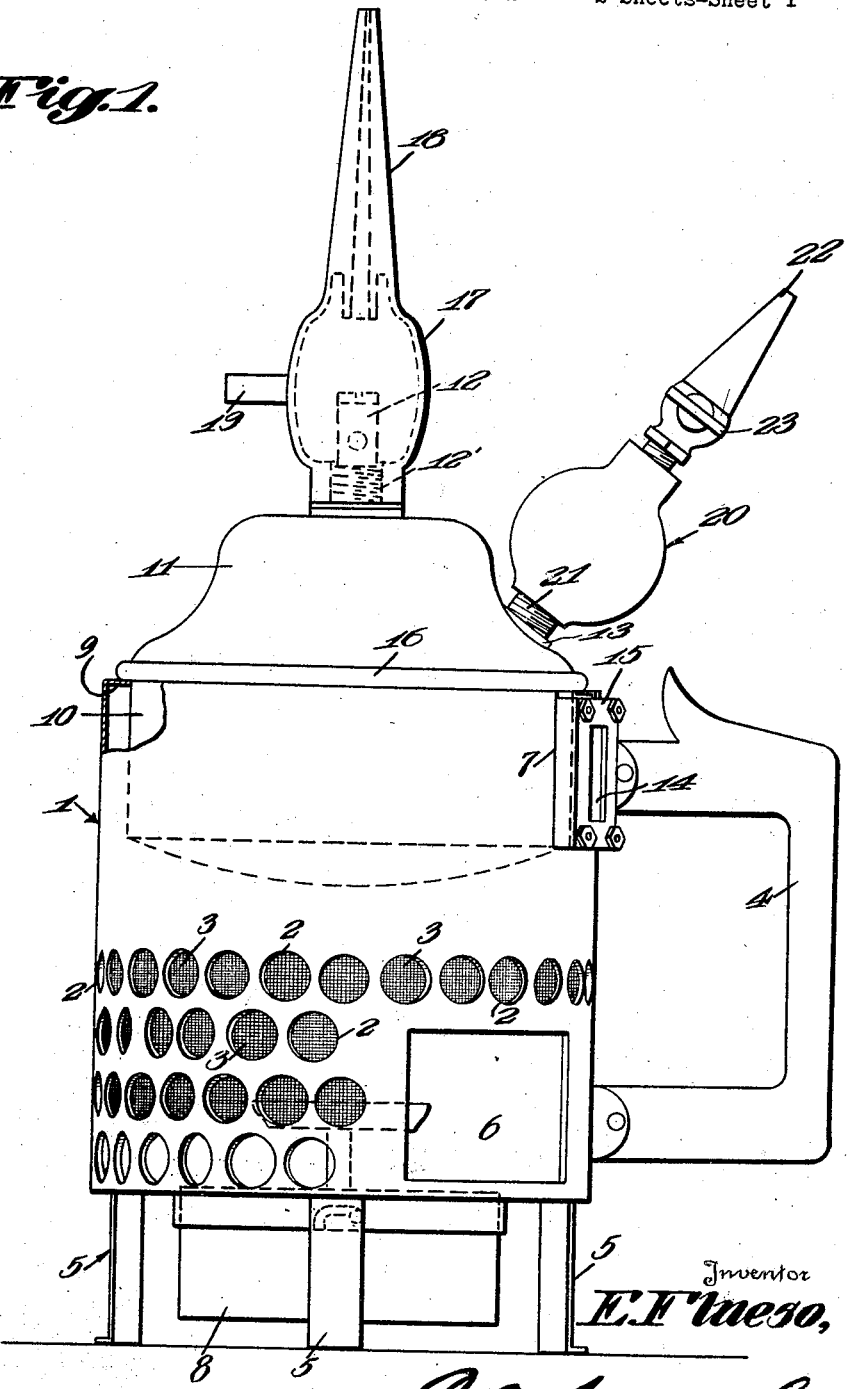

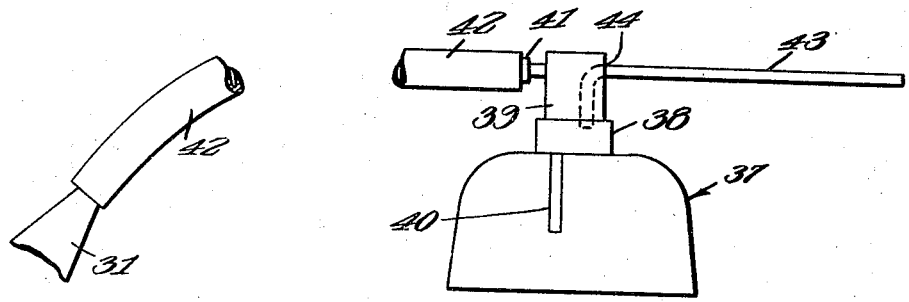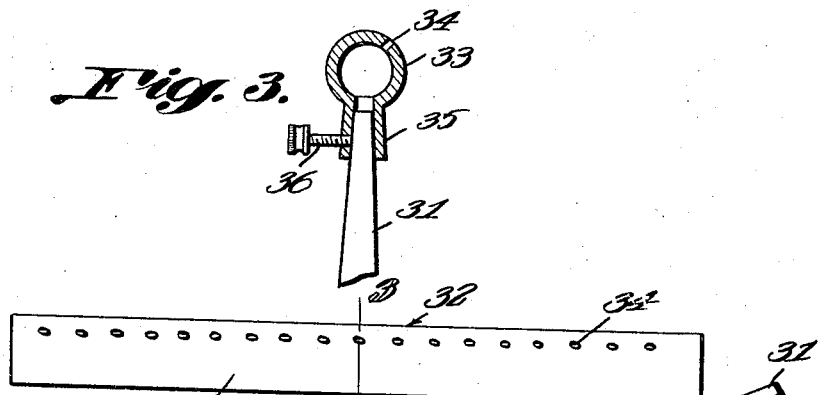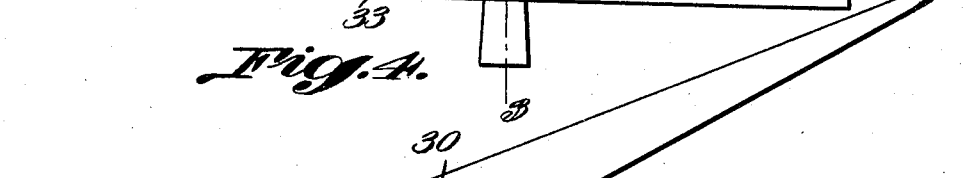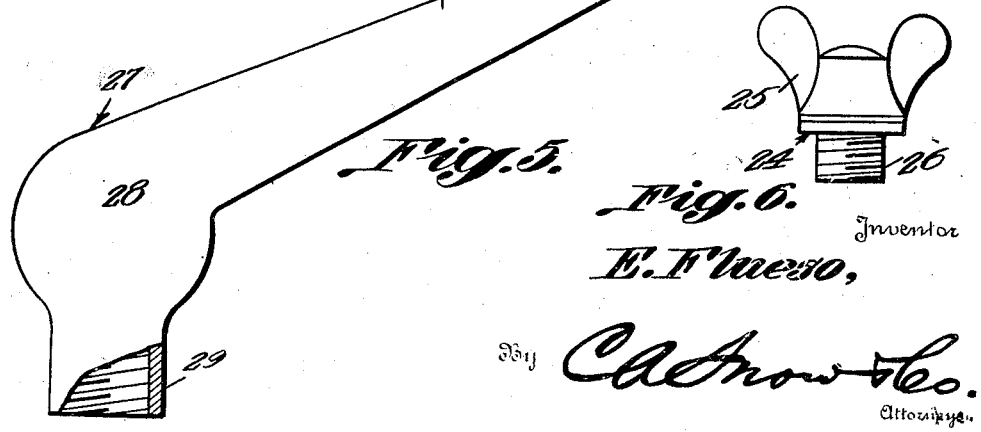

1,484,017

UNITED STATES PATENT OFFICE.

EDYTHE FLUESO, OF ALLENTOWN, PENNSYLVANIA.

SPRAYER.

Application filed October 12, 1922. Serial No. 594,074.

*To all whom it may concern:*

Be it known that I, EDYTHE FLUESO, a citizen of the United States, residing at Allentown, in the county of Lehigh and State of Pennsylvania, have invented a new and useful Sprayer, of which the following is a specification.

This invention relates to spraying devices designed for various uses.

The object of the invention is to provide a light, portable sprayer equipped with interchangeable nozzles to adapt the device for various uses.

Another object is to provide a device of this character equipped with a safety valve which performs two distinct functions, first to take care of the surplus steam, and second to release the steam at the proper working pressure for the different uses.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 represents a side elevation of a sprayer constructed in accordance with this invention showing two forms of nozzle mounted thereon.

Fig. 2 is a detail side elevation showing what may be termed a converter for use in connection with the sprayer.

Fig. 3 is a detail sectional view taken on the line 3—3 of Fig. 4.

Fig. 4 is a side elevation of one of the spray nozzles, used in connection with the apparatus.

Fig. 5 is a similar view of another form of nozzle, and

Fig. 6 is a side elevation of the stopper employed for closing one of the nozzle attaching apertures when not desired for use.

In the embodiment illustrated, the sprayer constituting this invention comprises a portable casing 1 of any desired configuration, being here shown cylindrical and preferably constructed of aluminum. This casing is equipped with a plurality of annular series of openings 2, preferably having a foraminous fabric in the form of a screen-wire 3 arranged over these openings on the inner face of the casing. This housing or casing is shown equipped with a handle 4 projecting laterally from one side thereof to facilitate its transportation. The casing is also equipped with supporting legs 5, any desired number of which may be employed.

Any suitable heat producing unit may be employed in connection with the casing 1, an alcohol lamp 8 being here shown detachably mounted in the bottom of the casing and to which access is had through an opening 6 formed in one side wall, preferably at a point adjacent the handle 4.

The housing or casing 1 is provided at its upper end with a cut out portion or recess 7 for a purpose presently to be described, and said top portion is equipped with an inturned annular flange 9 which forms a support for a steam producing vessel 10 which is detachably mounted in the upper end of the casing, being supported on the flange 9 by an annular bead 16 arranged at the junction of the top 11 of the casing with the body portion thereof. The top 11 is preferably dome-shaped in form and has a vent valve 12 at its apex and a threaded socket 13 at one side. The vent valve is externally threaded at its base as shown at 12 to provide attaching means for interchangeable nozzles, designed to be used in connection with the steamer.

A sight opening covered by a transparent closure 14 is arranged in one side of the body of the steamer 10 and is preferably surrounded by a reinforcing frame 15 which is of a shape and size to fit within the opening 7 formed in the upper end of the casing 1. This sight opening is designed to disclose the water line in the vessel 10.

The heat unit employed is to be of such capacity that the safety valve 12 can easily handle all the steam that the unit is capable of generating, thereby rendering the device absolutely safe. The valve preferably releases at about fifteen pounds pressure, and the maximum amount of pressure will not be more than twenty-two pounds.

A plurality of interchangeable nozzles or discharge pipes are designed for connection with the steam chamber 10 by mounting them on the threaded base 12' of the safety valve, or inserting them in the threaded socket 13. The nozzle 17 shown in Fig. 1, has an enlarged bulb-like body portion with a nozzle or spout 18 tapering toward its free end, said spout being shown in longitudinal alinement with the nozzle. A laterally extending arm 19 provides a finger grip to facilitate application and removal of the nozzle. It will thus be seen that with the nozzle 17 applied as shown in Fig. 1 when the steam pressure in the vessel 10 reaches a predetermined point such as fifteen pounds more or less, the valve 12 will release the steam and permit it to pass out through the nozzle where it may be employed for any desired purpose, any attachment being connected with the spout 18.

Another discharge pipe or nozzle is shown at 20 and is removably mounted in the socket 13 of Fig. 1 and includes a threaded neck 21 for engagement with said socket, terminating at its opposed end in a tapered spout or nozzle 22 and equipped with a valve 23, for controlling the passage through the nozzle.

A removable closure 24 is provided for the socket 13 when it is not desired to connect a nozzle therewith and as shown, comprises a threaded shank 26 to form a stopper for the socket and equipped with a wing nut or finger grip 25 to facilitate its application and removal.

In Fig. 5, another form of nozzle is shown and comprises a bulb-like body portion 28 having an internally threaded tubular neck 29 for engagement with the threaded base 12' of the safety valve. A spout 30 extends at an oblique angle from the body portion 28 and terminates in a tapered discharge end 31 with which any suitable attachment may be connected. In Figs. 3 and 4, a separate device 33 is shown applied to the end 31 of nozzle 30 and is constructed in the form of a cylindrical nozzle closed at its opposite ends and provided through its length at one side thereof with a plurality of longitudinally spaced perforations 34 through which the steam generated in the vessel 10 with which this nozzle is connected is to be ejected. A sleeve-like extension 35 projects laterally from the central portion of the nozzle 33 and is shaped to conform to the end 31 of nozzle 30 or to the ends of the nozzles 18 and 22 and may be detachably connected therewith by means of a set screw 36.

A converter in the form of a container 37 is designed for use in connection with the respective nozzles and is equipped with a threaded sleeve or thimble 38 surrounding an opening in the top thereof with which is engaged a screw cap 39 having a pipe 40 extending therethrough into the container 37. This cap also has an opening 44 which communicates with a pipe 43 extending at right angles from the cap to provide a spray nozzle through which steam mixed with the contents of the container is discharged and may be used for spraying a person's throat, nose or for any other purpose. The pipe 40 communicates with a right angular extension 41 to which a flexible hose 42 is designed to be connected. This hose 42 may be of any desired length and is adapted for connecting the container 37 with any one of the nozzles which is mounted on the steamer 10 so that when the container is filled with a medicant, disinfectant, oil or the like, which it is designed to combine with the steam and discharge through the nozzle 43, the pipe 42 is connected with the nozzle which is applied to the steamer preferably to the nozzle 22 so that the amount of steam fed through the container may be controlled by the valve 23.

From the above it will be obvious that the steam entering the container 37 through the pipe 40 will combine with the contents thereof and be discharged in the form of spray through the nozzle 43.

It is to be understood that this sprayer may be used for various purposes such as steaming velvet, ribbons or the like and the nozzle 33 is especially adapted for such use.

When it is desired to combine with the steam used for this purpose any cleaner or coloring ingredient, it may be supplied by connecting up the converter 37 with the nozzle employed, it being of course understood that when the converter is used, either nozzle 20 or 30 must be employed since no means are provided for connecting the converter with the nozzle 33.

The apparatus when applied to the millinery trade will be equipped with two spouts, one similar to that shown in Figs. 3 and 4 and the other may be either in the form shown in Fig. 1 or that shown in Fig. 5.

I claim:

1. A sprayer of the class described comprising a housing having a heat generating unit mounted therein, a closed steam generating vessel mounted in said housing over said unit, and a safety valve in the top of said vessel having means for connection of a nozzle.

2. A sprayer of the class described comprising a housing having a heat generating unit mounted therein, a closed steam generating vessel mounted in said housing over said unit and having a dome-shaped top with a safety valve in its apex and a threaded nozzle receiving socket in one side wall of said top, said valve having a threaded base for attachment of a nozzle.

3. In a device of the class described, a cylindrical housing having perforations formed therein and provided with supporting feet, the top of said housing being open and having an inturned flange with a recess opening through said flange, a closed steam generating vessel having a radially extending bead to support it on said flange, and a side opening in one side wall equipped with a reinforcing frame adapted to seat in the recess of the housing, and a safety valve mounted in the top of said vessel and provided with means for connecting a nozzle thereto.

In testimony that I claim the foregoing as my own, I have hereto affixed my signature in the presence of two witnesses.

EDYTHE FLUESO.

Witnesses:
 WM. M. RINKER,
 EMIL FLUESO.